United States Patent
Sedarat

(10) Patent No.: US 10,097,237 B1
(45) Date of Patent: Oct. 9, 2018

(54) ON-CHIP ALIEN CROSSTALK CHARACTERIZATION AND DIAGNOSTICS

(71) Applicant: Aquantia Corporation, San Jose, CA (US)

(72) Inventor: Hossein Sedarat, San Jose, CA (US)

(73) Assignee: Aquantia Corp., Milpitas, CA (US)

( * ) Notice: Subject to any disclaimer, the term of this patent is extended or adjusted under 35 U.S.C. 154(b) by 128 days.

(21) Appl. No.: 14/961,802

(22) Filed: Dec. 7, 2015

Related U.S. Application Data

(60) Provisional application No. 62/088,524, filed on Dec. 5, 2014.

(51) Int. Cl.
*H04B 3/487* (2015.01)

(52) U.S. Cl.
CPC .................................. *H04B 3/487* (2015.01)

(58) Field of Classification Search
CPC ..................................................... H04B 3/487
See application file for complete search history.

(56) References Cited

U.S. PATENT DOCUMENTS

| | | | |
|---|---|---|---|
| 6,057,743 A | 5/2000 | Aekins | |
| 6,160,790 A | 12/2000 | Bremer | |
| 6,201,796 B1 | 3/2001 | Agazzi et al. | |
| 6,208,671 B1 | 3/2001 | Paulos et al. | |
| 7,081,763 B1* | 7/2006 | Zhu | H04B 3/487 |
| | | | 324/539 |
| 7,177,283 B2 | 2/2007 | Fukae et al. | |
| 7,236,463 B2 | 6/2007 | Lai | |
| 7,346,012 B2 | 3/2008 | Stopler | |
| 7,701,867 B2 | 4/2010 | Bui | |
| 7,720,075 B2 | 5/2010 | Costo | |
| 7,881,322 B1 | 2/2011 | Benveniste | |
| 7,983,289 B2 | 7/2011 | Yamanaka et al. | |
| 8,271,807 B2 | 9/2012 | Jackson | |
| 8,274,894 B2 | 9/2012 | Kneckt et al. | |
| 8,335,937 B2 | 12/2012 | Qi et al. | |
| 8,659,986 B1 | 2/2014 | Martinson et al. | |
| 9,742,465 B1* | 8/2017 | Sedarat | H04B 3/32 |
| 2005/0042931 A1 | 2/2005 | Lavie | |
| 2006/0182014 A1* | 8/2006 | Lusky | H04B 3/23 |
| | | | 370/201 |
| 2006/0203742 A1* | 9/2006 | Bui | H04L 43/50 |
| | | | 370/252 |
| 2007/0064151 A1 | 3/2007 | Chang et al. | |
| 2007/0248024 A1 | 10/2007 | Conway et al. | |
| 2010/0135374 A1* | 6/2010 | Kozek | H04M 3/304 |
| | | | 375/227 |
| 2010/0156437 A1* | 6/2010 | Cobb | G01R 31/021 |
| | | | 324/614 |

(Continued)

FOREIGN PATENT DOCUMENTS

WO    WO 2011/056970 A2    5/2011

*Primary Examiner* — Rina C Pancholi
(74) *Attorney, Agent, or Firm* — Lance Kreisman; Peninsula Patent Group

(57) ABSTRACT

A method for characterizing alien crosstalk between an aggressor link and a victim link is disclosed. The method includes operating a transmit transceiver coupled to the aggressor link in a transmit mode of operation. A receive transceiver is coupled to the victim link in a receive mode of operation. Using the receive transceiver, a parameter is measured that is associated with alien crosstalk due to transmissions from the aggressor link.

20 Claims, 6 Drawing Sheets

(56) References Cited

U.S. PATENT DOCUMENTS

2011/0286391 A1 11/2011 Chen et al.
2011/0292977 A1 12/2011 Farjadrad
2012/0051240 A1 3/2012 Dwivedi et al.
2012/0195227 A1 8/2012 Vedantham et al.

* cited by examiner

ON-CHIP ALIEN CROSSTALK CHARACTERIZATION AND DIAGNOSTICS

CROSS-REFERENCE TO RELATED APPLICATIONS

This application is a Non-Provisional that claims priority to U.S. Provisional Application No. 62/088,524, filed Dec. 5, 2014, entitled ALIEN CROSSTALK CHARACTERIZATION AND DIAGNOSTICS, which is incorporated herein by reference in its entirety.

TECHNICAL FIELD

The disclosure herein relates to communications systems, and more specifically to high-speed Ethernet systems and methods.

BACKGROUND

Much of today's modern Ethernet infrastructure is based on twisted pair copper cables that meet certain specifications. One common "category" of Ethernet cable is identified as CAT5e, which is rated for data rates up to 1 Gbps. Recently, however, proposals have been made to use the existing Ethernet infrastructure in the enterprise environment for data rates above 1 Gbps and up to 5 Gbps and beyond. Using cabling such as CAT5e at higher rates poses challenges such as alien crosstalk.

The Ethernet network in an enterprise environment includes many point-to-point data links. A signal on one data link may cause alien crosstalk noise into another adjacent link. CAT5e cable is generally not standardized for alien crosstalk, and the operating behavior typically varies widely from cable to cable and setup to setup.

Conventional methods to measure alien crosstalk involve using measurement devices that involve manually disconnecting cables from network switch connections and reconnecting the cables onto measurement equipment. While helpful for its intended applications, the process and equipment involves significant time and effort to perform diagnostic tests.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of an Ethernet transceiver IC chip, method of operation, and methods of diagnosing Ethernet links are described herein. In one embodiment, a method for of measuring alien crosstalk between an aggressor Ethernet link and a victim Ethernet link is disclosed. Each of the aggressor and victim links include multiple channels. The method includes initiating a diagnostic mode of operation for the aggressor link and the victim link. A signal pattern is then transmitted on the aggressor link. This signal is received as alien crosstalk along the victim link during the transmitting of the signal pattern. The receiving is carried out by circuitry in an Ethernet transceiver chip disposed at one end of the victim link. The received signal is then processed to generate alien crosstalk information. By carrying out alien crosstalk measurements with circuitry internal to an Ethernet transceiver chip, the use of cumbersome and time-consuming measurement equipment and measurement methods can be avoided.

Figure 1:
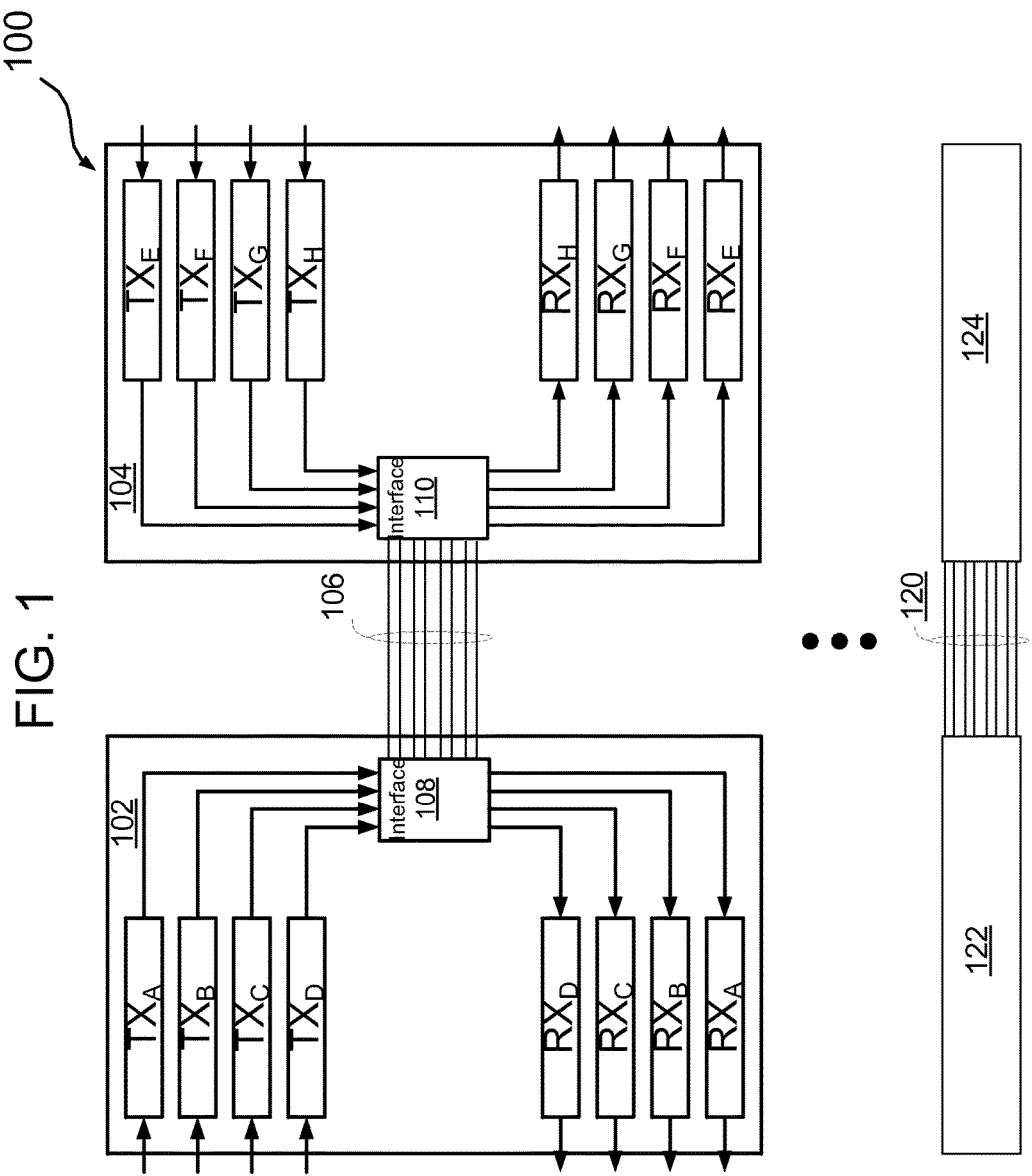
FIG. 1 illustrates a high-level transmitter/receiver (transceiver) channel architecture for an NBASE-T Ethernet transceiver.

FIG. 1 is a block diagram illustrating one embodiment of a communication system 100. The system includes a first transceiver integrated circuit (IC) or chip 102 and a second transceiver chip 104 that can communicate with each other. The first transceiver 102 includes "transceiver components" including one or more transmitters $TX_A$-$TX_T$ and one or more receivers $RX_A$-$RX_D$. Similarly, the second transceiver 104 includes various transceiver components including one or more transmitters $TX_E$-$TX_H$ and one or more receivers $RX_E$-$RX_H$. The transmitters $TX_A$-$TX_H$ shown in FIG. 1 can be considered individual "transmitters," as typically referenced herein, or can be considered individual transmitter channels which a transmitter block within the transceiver can independently transmit signals on. Similarly, receivers $RX_A$-$RX_H$ can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" associated with each respective transceiver which wants to communicate data over the communication network. For example, the transmitters receive data and control signals from the controller connected to the first transceiver 102 in order to send the data over the network to other transceivers and controllers, while the receivers receive data from other transceivers and controllers via the network in order to provide the data to the controller connected to the first transceiver 102.

The first transceiver chip 102 can communicate with the second transceiver chip 104 over one or more communication channels of a first communication link 106. A second independent communication link 120 is also shown, with third and fourth transceiver chips 122 and 124, respectively. For purposes of brevity, only the first link will be described in detail, it being understood that the second link is constructed similarly.

Further referring to FIG. 1, for one embodiment, such as one similar to the 10GBASE-T Ethernet standard, four communication channels are provided on the communication link 106, each channel including a twisted pair cable. Thus, in that standard, there are four transmitters TX and four corresponding receivers RX provided in each of the transceivers 102 and 104, each transmitter associated with one of the local near-end receivers in the same transceiver, and each such transmitter/receiver pair dedicated to one channel used for duplex communication. A transmitter/receiver pair in the first transceiver 102 communicates across a channel of the link 106 to a far-end transmitter/receiver pair in the second transceiver 104. A transmitter TX and a receiver RX that are connected to the same channel/link, or two transceivers connected by the communication link 106, are considered "link partners."

An interface 108 can be provided in the first transceiver chip 102 and an interface 110 can be provided in the second transceiver chip 104 to allow data transmissions between the transceivers to be routed to the appropriate transceiver blocks. For example, the interfaces 108 and 110 can include transformers, and circuitry used for directing signals or data (alternatively, some or all circuitry can be included in other components, such as transmitters TX and receivers RX).

In one example, from the point of view of the first transceiver chip 102, data transmissions during a normal or regular operation mode from a local transmitter TX are provided to the interface 108, which outputs the data on a corresponding channel of the communication link 106. The data is received by the link partner, the second transceiver chip 104. The interface 110 of the transceiver 104 provides the received data to its receiver RX connected to that same channel. Noise effects, such as near-end crosstalk and echo, may affect the data transmitted between the link partner transceivers. Echo and crosstalk filters associated with the same link may be used to filter out this noise so that the receivers receive only data from other transceivers.

In many instances, enterprise applications that employ the channel architecture of FIG. 1 utilize thousands of such deployments, resulting in complex crosstalk environments. Alien crosstalk, such as noise affecting one link (such as the first communication link 106), but due to crosstalk from a second link (such as the second communication link 120), can be particularly troublesome. Diagnosing alien crosstalk is even more problematic.

Figure 2:
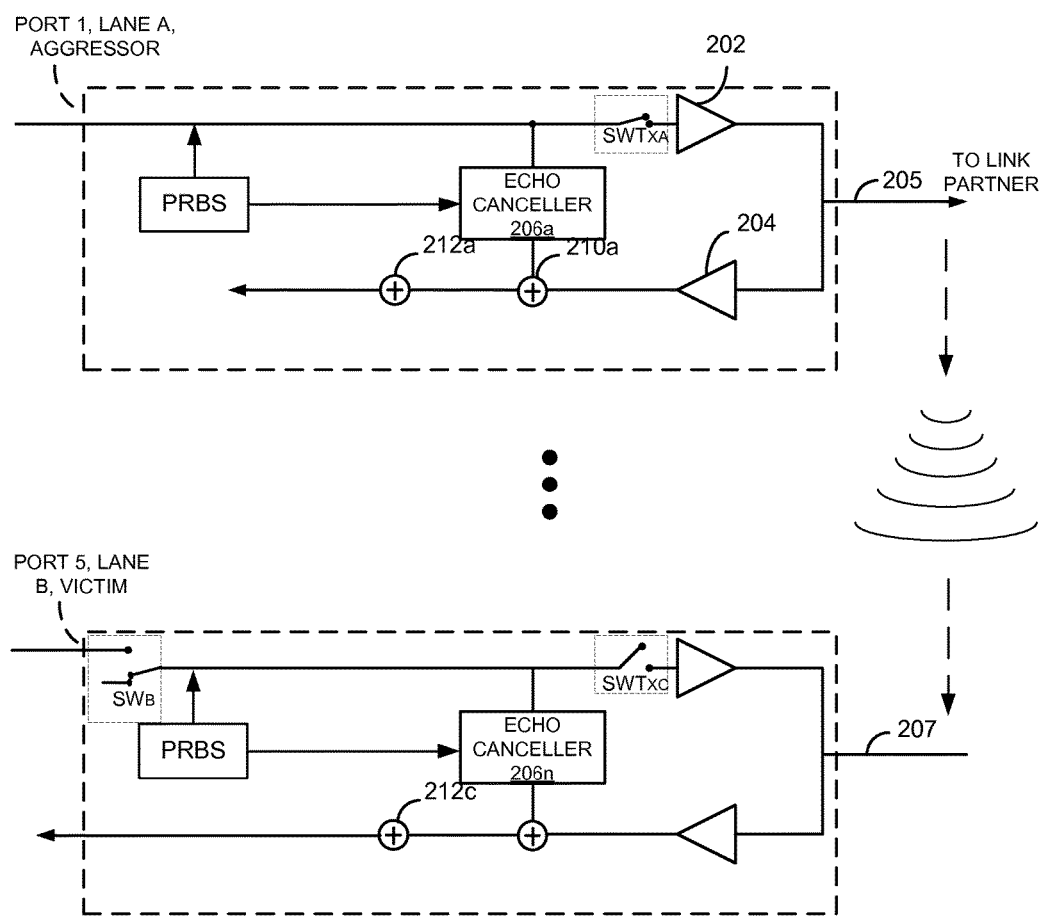
FIG. 2 illustrates further detail of a configuration between respective aggressor and victim links in an effort to characterize an alien crosstalk channel.

FIG. 2 illustrates further detail of the transceiver channel circuitry of FIG. 1 for one set of four lanes for each of a first Ethernet link 205, and a second Ethernet link 207 corresponding to the first and second links 106 and 120 of FIG. 1. The circuitry includes a first channel, or "lane" such as Lane A, associated with a link coupled to a particular network switch port, such as Port 1. For purposes of clarity, the relevant circuitry of Lane A will be described in detail, with the understanding that each of the lanes is similarly configured. A second channel is also shown, identified as Lane B, which may be coupled to a second port of the network switch, such as Port 5. Each of the network links may be providing access to an Ethernet network for various network devices, such as computers, printers, access points, or the like.

Further referring to FIG. 2, each lane includes transmit circuitry 202 defining a transmit path and receive circuitry 204 that defines a receive path. Together, the transmit and receive paths couple to a physical transmission medium 205 such as a differential pair of twisted copper wires corresponding to a portion of the link 106 (FIG. 1). Each channel may also include a pseudo-random bit stream (PRBS) generator 209 to generate an identical pattern of bits during a diagnostic mode of operation. This PRBS signal may be one of the standard training signals used for receiver training. The PRBS generator selectively provides the pattern to the transmit circuitry 202 and/or an echo canceller 206a that is disposed between the transmit and receive paths. The echo canceller characterizes echo signals resulting from reflections of transmit signals along the transmit path during normal operation. In the normal operation mode, the echo canceller generates a compensation signal and applies it to a summing circuit 210a which adds the compensation signal to the received signal from the receive circuitry 204 and thus minimize the effects of echo on the receive path. In normal operation, a trained echo canceller holds the complete information for echo channel. During a diagnostic mode of operation, one or more of the echo cancellers for one or more links may be reused to characterize the alien crosstalk channel.

Figure 3:
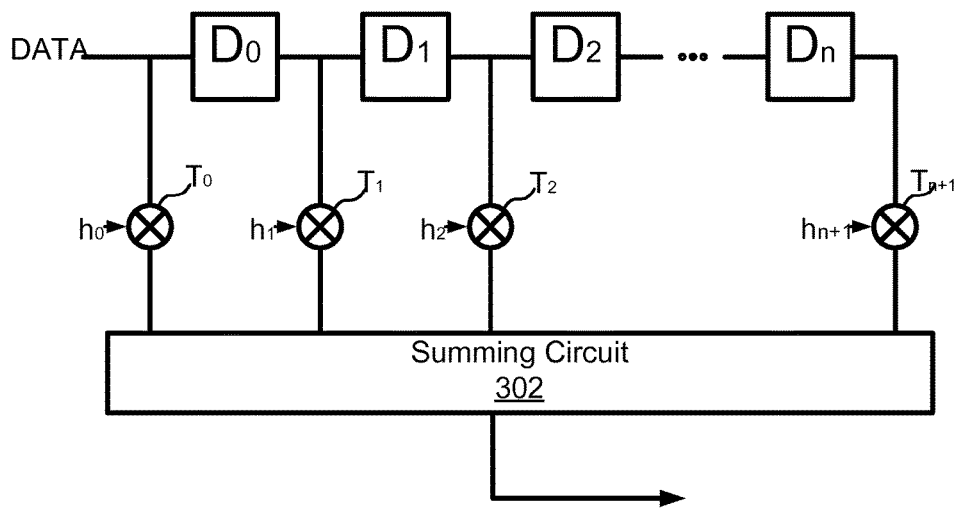
FIG. 3 illustrates further detail of a finite impulse response filter (FIR) architecture employed in the echo cancellers of FIG. 2.

In one embodiment, the echo cancellers 206a are realized as adaptive filters that continually adapt, and are more particularly realized as finite impulse response (FIR) filters. While the structure and operation of FIR filters are generally well-known to those skilled in the art, FIG. 3 illustrates one embodiment of a high-level implementation that includes a plurality of delay elements $D_0$-$D_n$, for delaying respective data samples DATA. A number of taps $T_0$-$T_n$ corresponding to the delay elements are respectively coupled to delay output nodes. The taps receive respective weights or coefficients $h_0$-$h_{n+1}$ that represent gain factors applied to a sequence of data samples in a weighted manner. A summing circuit 302 receives the weighted samples from the taps, averages them, and outputs a filtered value.

Operation of the circuitry described above may be carried out to diagnose and measure alien crosstalk during a diagnostic mode of operation. Generally, the diagnostic mode is provided as part of, or following a training phase of operations. The diagnostic mode enables for selection of a link to be an "aggressor" link, and one or more other links to be selected and configured as "victim" links. For one embodiment, during the diagnostic mode of operation, one or more of the echo cancellers may adapt to a diagnostic training pattern to characterize an alien crosstalk channel by generating an impulse response. The impulse response information may be used in a variety of ways to optimize link operation. When carried out globally, an entire network may be optimized in an automated and time-efficient manner.

Figure 4:
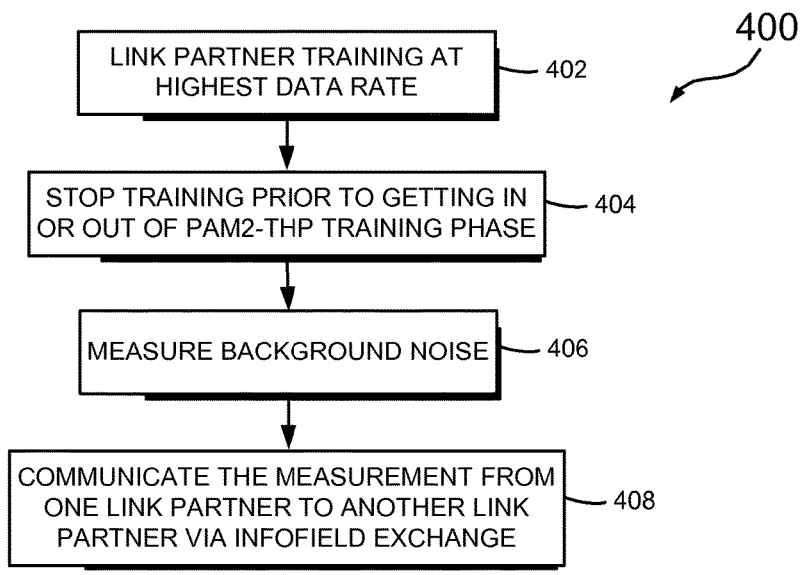
FIG. 4 illustrates a flowchart of steps for one embodiment of a method for characterizing alien crosstalk between a victim link and an aggressor link.

Referring now to FIG. 4, one embodiment of a method for characterizing alien crosstalk, generally designated 400, provides a mode of operation in an Ethernet transceiver that can characterize alien crosstalk from any aggressor link to a particular victim link in an enterprise environment. The aggressor link and the victim link each comprise four channels, such as shown in FIG. 1, with each group of four channels being associated with a different port of a network switch. At 402, link partners associated with the victim link and the aggressor link initiate a training process at the highest data rate possible. The training process may be initiated in response to a command received from a diagnostics controller tasked with diagnosing an Ethernet network environment. One embodiment of such a controller is described in U.S. patent application Ser. No. 14/961,806, titled: "Network Switch Apparatus and Methods For Global Alien Crosstalk Characterization, Diagnostics, and Network Optimization", filed Dec. 7, 2015, assigned to the assignee of the present invention, and expressly incorporated herein by reference. For some embodiments, such as those where the link partners meet 10GBASE-T standards, the highest data rate may be 10 Gbps.

Figure 5:
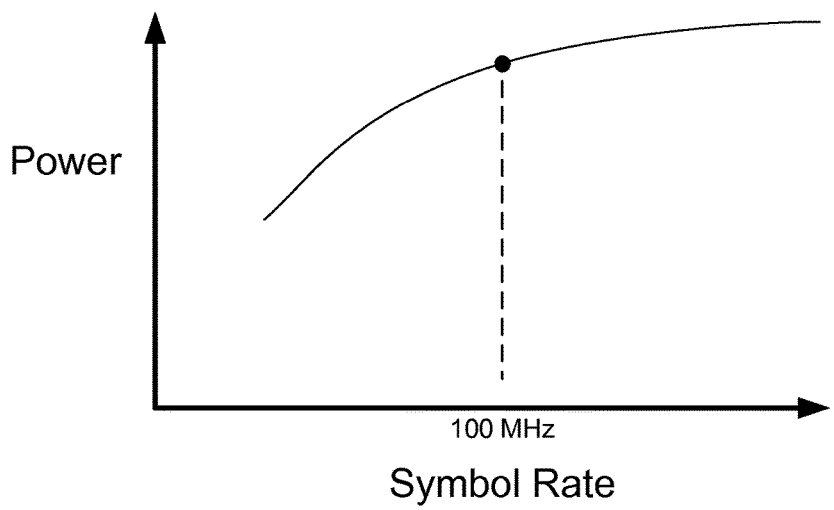
FIG. 5 illustrates a graph of power versus symbol rate for one embodiment of measuring alien crosstalk.

Further referring to FIG. 4, the training process may eventually include a PAM2-THP training phase. Prior to entering or exiting the PAM2-THP training phase, a coordinated Infofield exchange may be carried out to stop the training process, at 404. At this point, the link partners may enter the diagnostic mode or phase of operation, and measure background noise characteristics, at 406. The background noise shows the effect of alien crosstalk and other sources of noise and disturbance. For some embodiments, the measurement may result in a single value indicating the entire power of the measured noise, or across frequency as a value indicating the power spectral density (PSD) of the noise. A graphical representation of such information is shown in FIG. 5.

In one embodiment, the aggressor sends a single tone (sine-wave at a particular frequency) and the victim measures the power in that frequency. The receive signal power indicates how much power the victim receiver sees in that frequency. If the dominant receive signal in that frequency is from the aggressor link, this power indicates the gain of the alien crosstalk channel in that particular frequency. This power measurement may be done by inserting a bandpass filter in the receive path and measuring the power at the output of that filter. A feed-forward equalizer in the receiver of the victim link may be repurposed as this bandpass filter. Alternatively, the receive power at this frequency may be measured by cross-correlating the receive samples with similar sine-wave and cosine-wave samples. The power will be the square of these two cross-correlation factors. By sweeping the frequency of the tone from across the bandwidth of interest, one can identify the alien crosstalk channel gain (or loss) at each frequency.

In another embodiment, the aggressor link sends a wide band signal (such as one used in a normal training operation). The victim receiver can calculate the power spectral density (PSD) of the receive signal. The PSD identifies the power of signal at each frequency. If the aggressor signal is dominant component in the receive signal, this power indicates the alien crosstalk channel gain in that frequency. The PSD may be measured by inserting a bandpass filter in the receive path (for instance by repurposing the feed forward equalizer as a bandpass filter) and sweeping the center frequency of that bandpass filter. Alternatively, the receive samples may be cross correlated with sine-wave and cosine wave at various frequencies. The PSD can also obtained by calculating the Fourier transform of the receive signal (using an FFT engine, for instance) and averaging the power at each frequency.

A measurement of a detected signal-to-noise ratio (SNR) may instead be carried out in some embodiments to determine any effects from alien crosstalk.

A further embodiment, more fully described below, utilizes the adaptive filters (such as echo cancellers) provided by the transceiver channels to generate an impulse response of the alien crosstalk channel. Following the noise measurement, the value may be communicated from one link partner to the other through another protocol or a data exchange through Infofield, at 208. One embodiment of an Infofield-based data exchange protocol for information exchange over a link is described in U.S. patent application Ser. No. 14/961,797, titled: NBASE-T PHY-to-PHY Information Exchange Method and Apparatus", filed Dec. 7, 2015, assigned to the assignee of the present invention, and expressly incorporated herein by reference.

For some embodiments, the noise measurement can be performed while other crosstalking links are actively operating. In such cases, the background noise measurement on the link partners of a victim link identifies the overall crosstalk noise contributed from all other links in the network. This information may be used by an application software (such as the diagnostic controller referred to above) to limit the data rate on the victim link so that it may successfully operate in the presence of the measured alien crosstalk.

Figure 6:
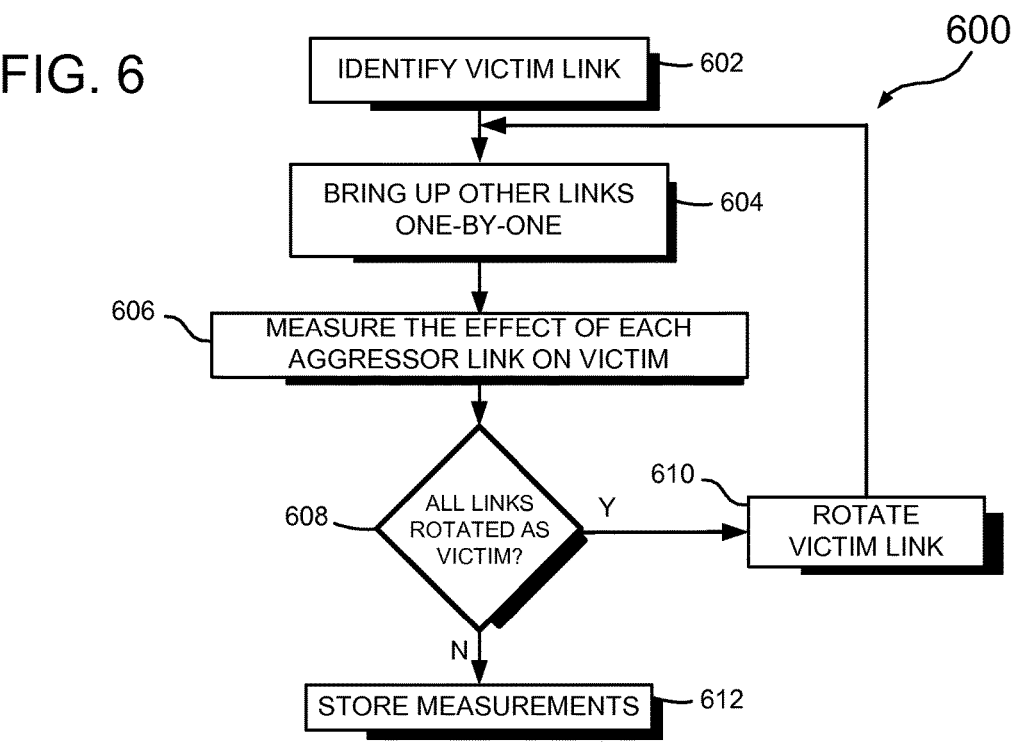
FIG. 6 illustrates a flowchart of steps for one embodiment of a method for characterizing an entire crosstalk environment in an Ethernet network.

FIG. 6 illustrates one embodiment of a method, generally designated 600, for utilizing the process described above to characterize an entire crosstalk environment in an Ethernet network. The method begins by identifying a first victim link, at 602. The other links of the network are brought up one-by-one, at 604, and the effect of each aggressor link on the victim is measured, at 606. A determination may then be made, at 608, as to whether all of the links have played the role of "victim" in the characterization process. If not all of the links have been characterized as a victim, then a new link is rotated into the victim role, at 610, and the bringing up of the other links and associated measurements are repeated. Once all of the links have been rotated through as a "victim" link, then the process stops. This extensive set of measurements can be used by an application software to limit the data rate on certain links such that the overall performance and throughput of the entire network is optimized.

In general, the crosstalk between two links may be excessive because of some fault in the cabling layout. An alien crosstalk channel may be identified by utilizing the signal processing circuitry already resident in the physical layer of an Ethernet link, such as an NBASE-T Ethernet transceiver. NBASE-T refers to twisted-pair copper Ethernet links that are capable of transferring data at a variety of data rates between, for example, 500 Mbps and 10 Gbps. Once an impulse response of the alien crosstalk channel is estimated, the information may be used in one or more of a variety of ways, such as varying the data rate of the affected link, re-configuring link partners, and so forth.

Figure 7:
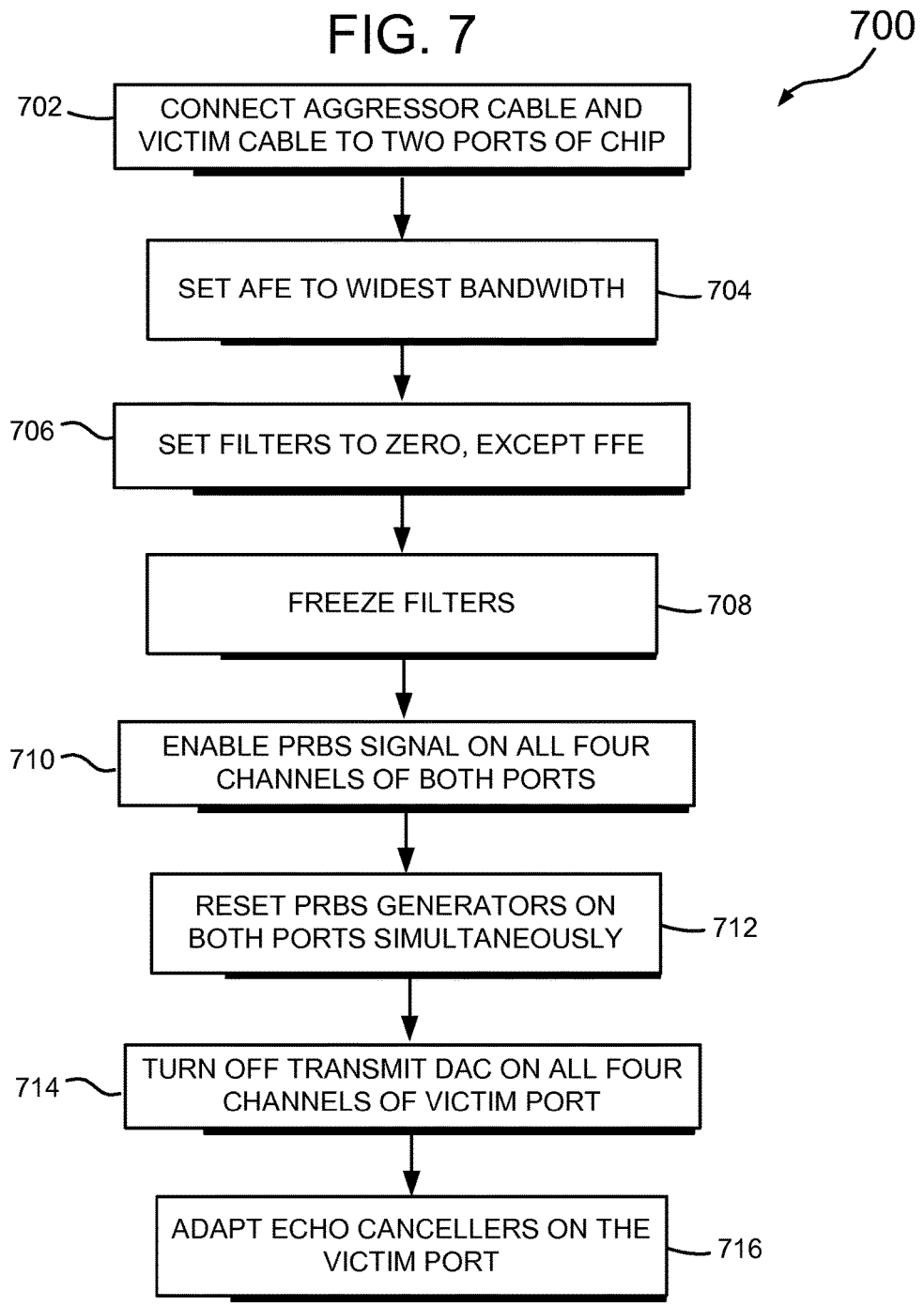
FIG. 7 illustrates a flowchart of steps for one embodiment of a method for characterizing an alien crosstalk channel formed between an aggressor link and a victim link.

FIG. 7 illustrates further detail for one specific method, generally designated 700, to derive an alien crosstalk channel from within an Ethernet network by generating an impulse response using the existing echo cancellers of the transceiver physical circuits (PHYs). The method involves first connecting or switching an aggressor cable and a victim cable to two ports (four channels each port) of the same Ethernet transceiver chip, at 702. The analog front end (AFE) of the chip is then set to its widest bandwidth, at 704, so that it doesn't filter the crosstalk channel response. At 706, all of the filters in the transceiver are set to zero, except for a feed-forward equalizer (FFE), which is set to a pass-through filter. All of the filter values are then frozen, at 708.

Further referring to FIG. 7, with all of the filters fixed to zeroed values, identical pseudo-random bit stream (PRBS) signals are transmitted on all four channels of each of the ports, at 710. The PRBS generators on both ports are reset simultaneously so that all eight channels on the two ports are fairly synchronized, at 712. To prevent the PRBS signal from propagating to the victim cable, the transmit digital-to-analog (DAC) on all four channels of the victim port is turned off, at 714. At this point, the training signal is only being transmitted on the aggressor channel of the aggressor port. However, all echo cancellers (EC) on all channels on both ports are being fed with the same PRBS signal.

With continued reference to FIG. 7, at 716, the echo cancelers begin an adaptation process. Since the input to the echo cancelers is identical to the PRBS signal that is being sent on the transmit channel of the aggressor port, the echo cancellers will converge to the impulse response of the crosstalk channel between the aggressor channel to each receive channel of the victim port.

While the specific example described above involves connecting/configuring the aggressor and victim cables to the same transceiver chip, other embodiments may involve cables attached to different chips. Utilizing the same PRBS pattern that is synchronized between the chips allows for measuring the alien crosstalk in this manner. The synchronization between aggressor and victim are at 2 levels: the clock frequencies of the aggressor and the victim are locked, and the PRBS is reset at the same time. This is straightforwardly achievable when the aggressor and victim links are associated with different PHYs of the same multi-port chip, or different PHYs on the same switch box. In these 2 cases, the clock sources are the same and the PRBS engines on various PHYs can be reset at the same time as they are physically connected to the same management unit. When the aggressor or victim are remotely connected to the management unit, then the clock synchronization is achieved by forcing the remote PHY to be Slave. Symbol synchronization for the PRBS generator may be achieved by a mechanism similar to the Transition Count Down as specified in the Infofield protocol of the link training as specified in the applicable IEEE standard for normal training sequences.

Figure 8:
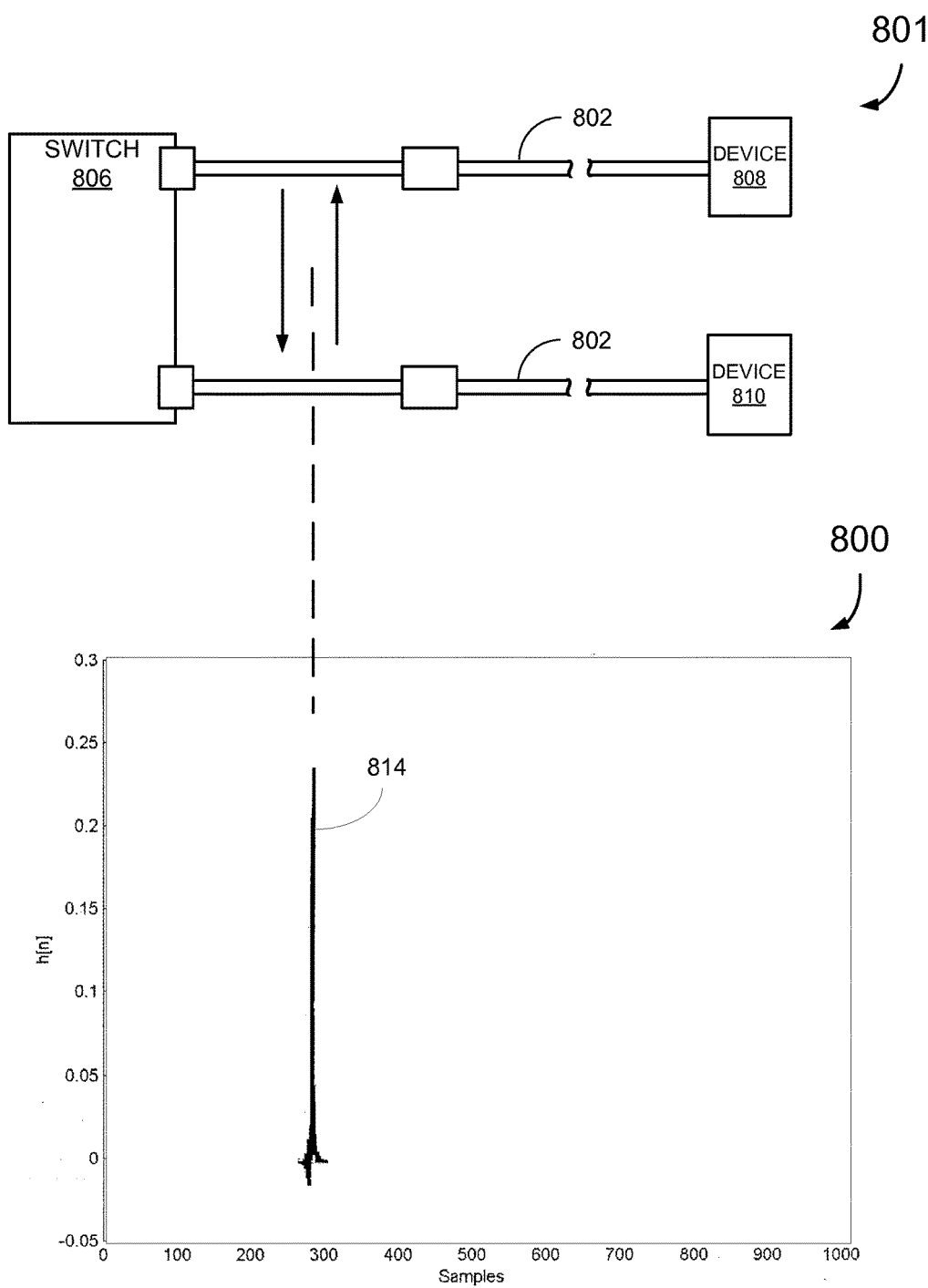
FIG. 8 illustrates a block diagram of one embodiment of an Ethernet network with multiple Ethernet cables, and an impulse response curve corresponding to alien crosstalk associated with at least two cables of the network.

The information obtained from the method of FIG. 7 may be used to generate an impulse response for the alien crosstalk channel, enabling a graphical depiction as shown in FIG. 8, at 800. The graphical depiction corresponds to the cable arrangement at 801, with respective links at 802 and 804. A network switch, at 806, provides access to an Ethernet network for devices 808 and 810. The links 802 and 804 may correspond to CAT5e Ethernet cables that are routed through a home, business, commercial building, or the like. By employing the diagnostic method described herein to diagnose and characterize alien crosstalk between the links, at 812 (corresponding to the peak, at 814, shown in the impulse response curve 800), a proper operating environment can be evaluated for the links. This may involve operating one or more of the links at a reduced rate to minimize the crosstalk, physically re-deploying the cables, or any one of a variety of other actions that may optimize the operability of the links. Techniques such as matched filtering and equalization, as described in U.S. patent application Ser. No. 13/625,820, titled "High-Speed Ethernet Diagnostic Apparatus and Method For Cross-Pair Faults", filed Sep. 24, 2012, assigned to the assignee of the instant application, and expressly incorporated by reference herein, may be used to maximize signal-to-noise ratio and compensate for channel insertion loss in determining the impulse response of the alien crosstalk channel.

Further, the methods described herein may be used to qualify cables employed by an existing network to confirm that the links can operate at certain data rates under a variety of operating conditions. Note also that the techniques described here in the context of alien crosstalk channel characterization can also be used to characterize other channels such as insertion loss and far-end crosstalk. In this case, the aggressors are channels of a far-end port which is directly linked to the local victim.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A method for in-situ network measurement of alien crosstalk between Ethernet links connected to respective network devices, the links and network devices defining an Ethernet network, the method comprising:
   selecting from among the Ethernet links an aggressor link and a victim link;
   initiating a diagnostic mode of operation for the aggressor link and the victim link;
   transmitting a known signal pattern on the aggressor link with a first Ethernet transceiver chip at a transmit end of the aggressor link;
   receiving noise along the victim link during the transmitting of the known signal pattern, the receiving carried out by circuitry in a second Ethernet transceiver chip disposed at a receive end of the victim link;
   processing the received noise to generate alien crosstalk information; and
   exchanging the generated alien crosstalk information between link partners of the victim link.

2. The method according to claim 1, wherein the generated alien crosstalk information comprises a power spectral density.

3. The method according to claim 1, wherein the generated alien crosstalk information comprises a signal-to-noise ratio (SNR).

4. The method according to claim 1, wherein the generated alien crosstalk information comprises an impulse response.

5. The method according to claim 1, further comprising synchronizing the aggressor and victim links based on the known signal pattern.

6. The method according to claim 5, wherein known signal pattern comprises a first pseudo random bit stream (PRBS) pattern, and the synchronizing comprises:
   generating a second PRBS pattern for the victim link; and
   synchronizing the first PRBS pattern with the second PRBS pattern.

7. The method according to claim 6, wherein each channel of the victim link includes an adaptive filter, and wherein the processing comprises:
   feeding the second PRBS pattern to the adaptive filter while receiving the noise associated with the transmitted first PRBS pattern; and
   generating an impulse response representing an alien crosstalk channel formed between the aggressor link and the victim link.

8. An Ethernet transceiver integrated circuit (IC) chip comprising:
   transmit circuitry to transmit signals along an Ethernet link;
   receive circuitry to receive signals from the Ethernet link; and
   logic disposed in the Ethernet transceiver IC chip, the logic operable during a diagnostic mode of operation to measure a parameter associated with the link, the parameter indicating a level of alien crosstalk affecting the link due to transmission of a known signal pattern along a second Ethernet link, the logic operable to generate alien crosstalk information corresponding to the measured parameter and to exchange the generated alien crosstalk information with a link partner.

9. The Ethernet transceiver IC chip according to claim 8, wherein the parameter comprises power spectral density.

10. The Ethernet transceiver IC chip according to claim 8, wherein the parameter comprises a signal-to-noise ratio (SNR).

11. The Ethernet transceiver IC chip according to claim 8, wherein the parameter comprises an impulse response.

12. The Ethernet transceiver IC chip according to claim 8, further comprising an adaptive filter to generate the impulse response.

13. The Ethernet transceiver IC chip according to claim 12, wherein:
   during a normal mode of operation, the adaptive filter is configured to provide a compensation signal to a received data signal.

14. The Ethernet transceiver IC chip according to claim 13, wherein the adaptive filter comprises an echo canceller.

15. The Ethernet transceiver IC chip according to claim 8, further comprising:
   a pattern generator to generate a sequence of bits defining the known signal pattern, the known signal pattern used to synchronize the link to another link during the diagnostic mode of operation.

16. The Ethernet transceiver IC chip according to claim 15, wherein:
   during the diagnostic mode of operation, the Ethernet transceiver chip is configured for diagnostic operation as part of an aggressor link; and
   the transmit circuitry is configurable to transmit the known signal pattern to a link partner over the aggressor link.

17. The Ethernet transceiver IC chip according to claim 15, wherein:
   during the diagnostic mode of operation, the Ethernet transceiver chip is configured for diagnostic operation as part of a victim link; and
   the receive circuitry is configurable to feed a copy of the known signal pattern to an adaptive filter.

18. A method of operation in an Ethernet transceiver intergrated circuit (IC) chip, the method comprising:
   receiving a command to enter into a diagnostic mode of operation;
   receiving a configuration signal to operate as a portion of a victim link;
   receiving noise along the victim link during the transmission of a known signal pattern from an aggressor link;
   processing the received noise to generate alien crosstalk information; and
   exchanging the generated alien crosstalk information with a link partner.

19. The method according to claim 18, wherein the generated alien crosstalk information comprises at least one of a power spectral density, a signal-to-noise ratio (SNR) and an impulse response.

20. The method of claim 18, further comprising:
   synchronizing to the aggressor link.

* * * * *